United States Patent
Abdo

(10) Patent No.: US 7,154,504 B2
(45) Date of Patent: Dec. 26, 2006

(54) SYSTEM AND METHOD FOR FAST, SMOOTH RENDERING OF LIT, TEXTURED SPHERES

(75) Inventor: Nadim Abdo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 925 days.

(21) Appl. No.: 09/770,706

(22) Filed: Jan. 26, 2001

(65) Prior Publication Data

US 2002/0101429 A1 Aug. 1, 2002

(51) Int. Cl.
*G09G 5/00* (2006.01)

(52) U.S. Cl. .................... 345/581; 345/582; 345/583; 345/584; 345/426; 345/612

(58) Field of Classification Search ............... 345/426, 345/581, 582, 583, 584, 612
See application file for complete search history.

(56) References Cited

U.S. PATENT DOCUMENTS

| | | | |
|---|---|---|---|
| 5,446,833 A | | 8/1995 | Miller et al. |
| 5,572,635 A | * | 11/1996 | Takaizawa et al. ......... 395/126 |
| 5,736,991 A | * | 4/1998 | Tada ........................ 345/474 |
| 6,097,400 A | * | 8/2000 | Dilliplane et al. ......... 345/443 |
| 6,400,362 B1 | * | 6/2002 | Uchiyama et al. ......... 345/420 |
| 6,697,062 B1 | * | 2/2004 | Cabral et al. ............. 345/419 |

OTHER PUBLICATIONS

F. Espinal, et al., *Spherical Environment Maps for Image-Based Rendering*, Proceedings of the SPIE—The International Society for Optical Engineering, Apr. 16, 1998, vol. 3367, p. 87-97.

Kraus, U., *Brightness and Color of Rapidly moving Objects: The Visual Appearance Of a Large Sphere Revisited*, American Journal Of Physics, 2000, vol. 68, NI (Jan.), p. 56-60.

Sing Bing Kang & Huong Quynh Dinh, *Multi-Layered Image-Based Rendering*, Proceedings. Graphics Interface, Jun. 2-4, 1999, p. 98-106.

S. Parker, et al., Interactive Ray Tracing for Isosurface Rendering, Proceedings Visualization, Oct. 18-23, 1998, p. 233-238, 538.

R. Raskar, et al., *The Office of the Future: A Unified Approach to Image-Based Modeling and Spatially Immersive Displays*, Computer Graphics. Proceedings. SIGGRAPH Conference Proceedings, Jul. 19-24, 1998, p. 179-188.

European Search Report dated Oct. 21, 2005, mailed Nov. 2, 2005 for European Patent Application Serial No. EP 01 12 8543, 4 pages.

Miller et al., "On-the-Fly Texture Computation for Real-Time Surface Shading", IEEE Computer Graphics and Applications, IEEE Inc., Mar. 1998, pp. 44-58, vol. 18, No. 2, New York, US.

Fletcher et al., "Interactive Shading for Surface and Volume Visualization on Graphics Workstations", IEEE Conference on Visualization Proceedings, Oct. 25-29, 1993, pp. 291-299.

Thomas C. Palmer, et al., "Context-free Spheres: A New Method for Rapid CPK Image Generation", J. Mol Graphics, Sep. 1988, pp. 149-154, vol. 6, No. 3.

* cited by examiner

Primary Examiner—Kimbinh T. Nguyen
(74) Attorney, Agent, or Firm—Amin, Turocy, & Calvin, LLP

(57) ABSTRACT

Disclosed is a system for rendering an image of an object having a curved surface. The system includes a component for determining an integer M number of attributes relating to rendering the image and a component for pre-computing an integer N number of attributes relating to rendering the image. N is less than or equal to M and the N number of attributes are pre-computable.

23 Claims, 12 Drawing Sheets

Draw A Sphere (input Radius, CenterX, CenterY, VectLight, VectViewer,
                VectorPole, VectorEquator)
    // the image inputs include the size of the sphere, where it is to be drawn,
    // where a lighting source is positioned and where a viewer is positioned
{
    // set up initial vectors
    vectSpecularHighlight = Normalize(vectViewer + vectLight);
    vectPoleCrossEquator = VectorPole cross VectorEquator;

// prepare lookup tables, can be computed before rendering
    // portions of later calculations pre-calculated here b/c x & y invariant to
    // other parameters
    for ( i = -rad; i <= rad; i++)
    {       j = i * 1 / rad;
            xMultiplyDiffuse[i] = j * vectLight.x;;  // setup diffuse component
            yMultiplyDiffuse[i] = j * vectLight.y;
            xMultiplySpecular[i] = j * vectSpecularHighlight.x; // setup specular
            yMultiplySpecular[i] = j * vectSpecularHighlight.y;
            xMultiplyPole_LUT[i] = j * vectorPole.x;   // used for texture
            yMultiplyPole_LUT[i] = j * vectorPole.y;
            xMultiplyEquator_LUT[i] = j * vectorEquator.x; // setup equator
            yMultiplyEquator_LUT[i] = j* vectorequator.y;
            xMultiplyPE_LUT[i] = j * vectPoleCrossEquator.x; // where pole &
            xMultiplyPE_LUT[i] = j * vectPoleCrossEquator.y; //equator cross
    }
    for ( x = 0; x < rad; x++ )    // finite set of discriminants
    {       disc = r^2 - x^2;
            for ( y = 0; y < x; y++ )     // thus finite set of z values
            {       disc = disc - y^2;
                    if ( disc > 0 )
                    {   zInvRad = 1 / (squareroot(disc) * radius;
                        zMultiplyDiffuse_LUT[disc] = zInvRad * vectLight.z;
                        zMultiplySpecular_LUT[disc] = zInvRad *
                                vectSpecularHighlight.z;
                        zMultiplyPole_LUT[disc] = zInvRad * vectorPole.z;
                        zMultiplyEquator_LUT[disc] = zInvRad * vectorEquator.z;
                        zMultiplyPE_LUT[disc] = zInvRad *
                                vectPoleCrossEquator.z;
                    } // end if
            } // end for y
    } // end for x
// proc cont'd on Fig. 7b
```

FIG 7A

```
// Iterate over the scanlines in the sphere
// combining the precomputed lookup elements as you go
// for each scan line
for ( y = -rad; y <= rad; y++ )
{       RadiusSubYSquare = r^2 - y^2;
        Bound = edgeBuffer[abs(y)];  // bound is the horizontal displacement from
                                     // y axis
        for ( x = (-bound + 1); x <= bound; x++ )
        {
            // iterate over every pixel in the scanline y
            disc = RadiusSubYSquare - x^2;  // compute disc for look up table
                                            // index
            diffuse = yMultiplyDiffuse[y] + xMultiplyDiffuse[x] +
                    zMultiplyDiffuse_LUT[disc];
            specular = yMultiplySpecular[y] + xMultiplySpecular[x] +
                    zMultiplyDiffuse_LUT[disc];
            specular = SpecularRemapLUT[specular];  // remap to range 0 -1.0

// compute the final intensity for a pixel
            intensity = diffuse * diffuseFactor + specular * specularFactor +
                        ambient * ambientFactor;
            // compute the u & v texture components for a pixel
            NormalDotPole = xMultiplyPole_LUT[x] + yMultiplyPole_LUT[y] +
                        zMultiplyPole_LUT[z];
            NormalDotEquator = xMultiplyEquator_LUT[x] +
                        yMultiplyEquator_LUT[y] + zMultiplyEquator_LUT[z];
            latitude = arccos(NormalDotPole);
            vTexture = latitutde/PI;
            longitude' = NormalDotEquator / sine(latitutde);
            clamp longitude' to range -1.0 to 1.0
            longitude = arccos(longitude');

// determine how longitude wraps around sphere
            if (xMultiplyPE_LUT[x] + yMultiplyPE_LUT[y] +
                    zMultiplyPE_LUT[disc] < 0 )
            {       uTexture = longitude;        }
            else
            { uTexture = 1 - longitude;          }

// fetch a textured pixel from coordiante uTexture, vTexture
            // scale intensity of textured pixel by Intensity
            // draw the lit, texture pixel at location ( x + centerX, y + centerY)
        } // end for x
} // end for y
} // end proc
```

152 → (points to `disc = RadiusSubYSquare - x^2;` line)

150 → (points to `intensity = diffuse * diffuseFactor + specular * specularFactor + ambient * ambientFactor;` line)

FIG. 7B

SYSTEM AND METHOD FOR FAST, SMOOTH RENDERING OF LIT, TEXTURED SPHERES

TECHNICAL FIELD

The present invention relates generally to computer graphics, and more particularly to rendering lit, textured spheres smoothly and quickly.

BACKGROUND OF THE INVENTION

As computer graphics have become more common, techniques for rendering images of objects smoothly and quickly have become more important. For example, computer aided drawing programs, computer animations and computer games may all require spheres to be drawn accurately and quickly. Conventionally, spheres may be rendered using ray tracing techniques and/or by tessellating a sphere into a number of other polygons, triangles for example. Such techniques may not produce the sphere quickly enough, or may fail to provide for smooth, accurate renderings of the sphere. For example, when tessellating, the image quality of the sphere may suffer unless a very large number of triangles (>1000) is utilized. But utilizing such a large number of triangles may slow down the rendering time of the sphere and of other graphics images. Similarly, although ray tracing may provide a smooth result, the rendering may be slower than desired because computing the intersection points, color components and texture components of the many rays of light projected into a scene, as is done in ray tracing methods, may be computationally slow. The slow computations involved in ray tracing may be exacerbated if the conventional ray tracing system does not store or pre-cache computations utilized in such intersection point, color and texture component processing.

Accurately rendering an image of a three dimensional, lit, textured sphere may depend on several attributes associated with the sphere. First, the rendering may account for the ambient light associated with the sphere. The ambient light is the light that is all around the sphere and which thus has an equal effect on the entire rendering. Next, diffuse light may be addressed. The intensity of the diffuse light on any point on the sphere may depend on the location of the light source and the angle of incidence of the light from the source on the point on the sphere. Next, the specular light associated with the sphere may be addressed. The intensity of the specular light on any point on the sphere depends on the location of the light source, and depends on the location of the viewer of the sphere. There may be multiple ambient, diffuse and specular light sources affecting a sphere and each light source may have a different location, intensity and color. Thus, conventionally rendering a lit sphere may require multiple equations dealing with numerous lighting attributes. Conventionally, such equations are computed during rendering and employ floating-point calculations.

Rendering a sphere may be further complicated if the sphere is "textured", that is, if the rendering includes wrapping a two-dimensional surface around the sphere to provide simulated relief or texture to the sphere. Conventionally, mapping a two-dimensional surface onto a curved three-dimensional surface has been complicated by run time translations of coordinate systems using floating-point arithmetic.

Thus, there remains a need for a method to smoothly render lit, textured spheres using as few calculations as possible to facilitate higher performance rendering.

SUMMARY

The present invention provides a method for quickly and accurately rendering textured, lit spheres. Enhancements in speed may be achieved by taking advantage of the symmetry found in such spheres, such symmetry leading to numerous calculations and portions of calculations being either constant or repeated in the rendering process. By determining which calculations may be repeated, by determining which calculations may produce constant values, and by pre-computing such values, enhancements in speed may be achieved by removing the pre-computed and constant values from run-time calculation.

Enhancements in accuracy may be achieved by representing the curved edges of the sphere as a continuous function, and not by a collection of polygons. Thus, a smoother edge may be produced. Further, since there is a finite set of sphere sizes (e.g. those that fit entirely on the display of a computer screen if displayed centered in that display) that may be displayed on a computer display, and since the edges are invariant to the light source, the set of curved edges for such a finite set may be pre-computed, removing edge calculations from run-time processing. Pre-computing the set of edges for a finite set of spheres and storing the set of edges in one or more edge buffers may further enhance rendering speed.

Three dimensional scene configurations may be rendered by computing the appropriate locations of the lighting, viewer, pole and equator values in a two-dimensional, integer-represented, rendering space. Thus the present invention treats the output image of a sphere as a two-dimensional object and fills in the two-dimensional object one scan line at a time. By employing a two-dimensional data space, integers may be used to represent the center of the sphere and the relative pixel distance from the center of the sphere for pixels (x,y). Similarly, the height (z) of a pixel may also be represented using an integer. Thus, conventional floating point calculations may be replaced with integer calculations, resulting in an enhancement in speed. Further, since some calculations are pre-computed, as described above, the integer operations may be relatively time efficient lookups and additions as opposed to relatively time inefficient multiplications, further enhancing the rendering speed.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 7A is a segment of pseudocode for pre-computing calculations employed in rendering an image of an object, in accordance with an aspect of the present invention;

FIG. 7B is a segment of pseudocode for employing pre-computed calculations in rendering an image of an object, in accordance with an aspect of the present invention;

DETAILED DESCRIPTION

Figure 1:
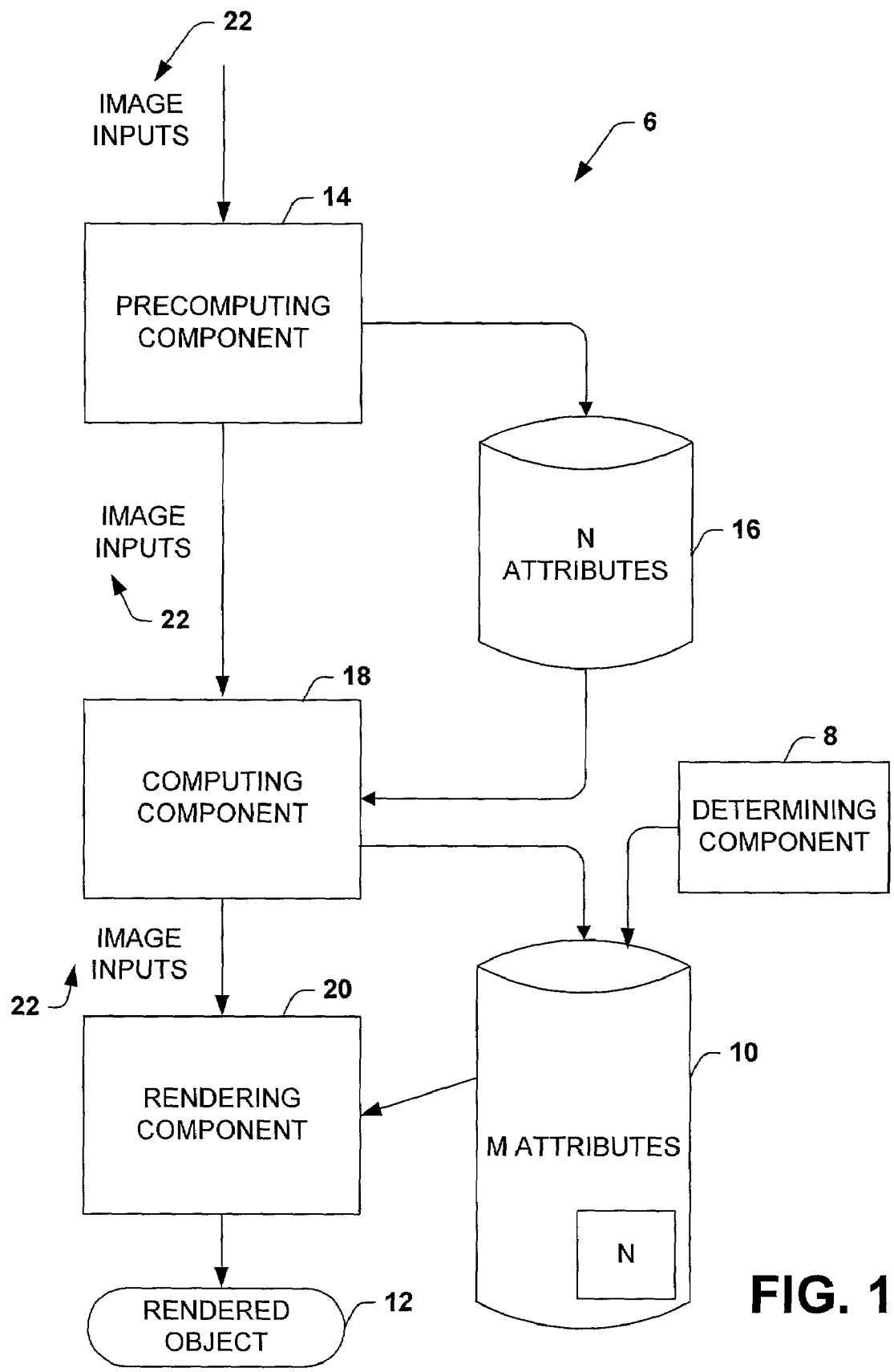
FIG. 1 is a schematic block diagram illustrating a system for rendering images of objects in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. In other instances, well-known structures and devices are shown in block diagram form in order to facilitate description of the present invention.

As used in this application, the term "determiner" is intended to refer to a computer-related entity, either hardware, a combination of hardware and software, software, or software in execution. For example, a determiner may be, but is not limited to, a process running on a processor, a processor, an object, an executable, a thread of execution, a program, and a computer. By way of illustration, both an application running on a server and the server can be determiners.

As used in this application, the term "component" is intended to refer to computer hardware, computer software, or a combination of hardware and software. For example, a component may be, but is not limited to, a running process, a processor executing a process, an object, an executable, a thread of execution, and a program. By way of illustration, both an application running on a server and the server can be components.

FIG. 1 illustrates a system 6 for rendering images of objects. The system 6 may include a determining component 8 that determines which of M attributes 10 relating to rendering an image may be employed in rendering that image, for example a lit, textured sphere. For example, the determining component 8 may facilitate choosing between attributes including, but not limited to, ambient lighting, diffuse lighting, specular lighting, colors, textures, bump maps, viewing positions, sphere sizes and sphere locations. The system 6 may produce a rendered image of an object 12 based on one or more of the M attributes 10. For example, in rendering a first image, a first number of attributes may be employed to render the first image, while in a second rendering of a second image, a second number of attributes may be employed to render the image.

The system 6 may also include a pre-computing component 14 for pre-computing N attributes 16 relating to rendering an image. For example, the pre-computing component 14 may pre-compute for one or more pixels (positionable in a three dimensional space by an x coordinate, a y coordinate and a z coordinate) N attributes 16 including, but not limited to, one or more of an ambient lighting component, a diffuse lighting component, a specular lighting component, a pole vector, an equator vector and a vector characterizing where the pole vector crosses the equator vector. The N attributes 16 may be stored, for example, in one or more lookup tables where the N attributes 16 may be available for use by a computing component 18 in computing the M attributes 10.

The system 6 may further include the computing component 18 for computing the M number of attributes 10. For example, given the pre-computed N attributes 16, the computing component 18 may compute the M attributes 10 including, but not limited to, an ambient lighting component, a diffuse lighting component, a specular lighting component, and a latitude and longitude value for mapping a texture coordinate. The system 6 may further include a rendering component 20 for producing an image of a rendered object 12 based on the M attributes 10 computed by the computing component 18.

The pre-computing component 14, the computing component 18 and the rendering component 20 may all receive image inputs 22. The image inputs 22 maybe employed to calculate the N attributes 16, the M attributes 10 and/or the rendered object 12. While the image inputs 22 are illustrated as passing through the pre-computing component 14 to the computing component 18 and then to the rendering component 20, it will be appreciated by one skilled in the art that other methods of providing the image inputs 22 may be employed in the present invention. It is to be further appreciated by one skilled in the art that although the pre-computing component 14, the computing component 18 and the rendering component 20 are illustrated as separate components, the components may be grouped into one or more computer programs.

Figure 2:
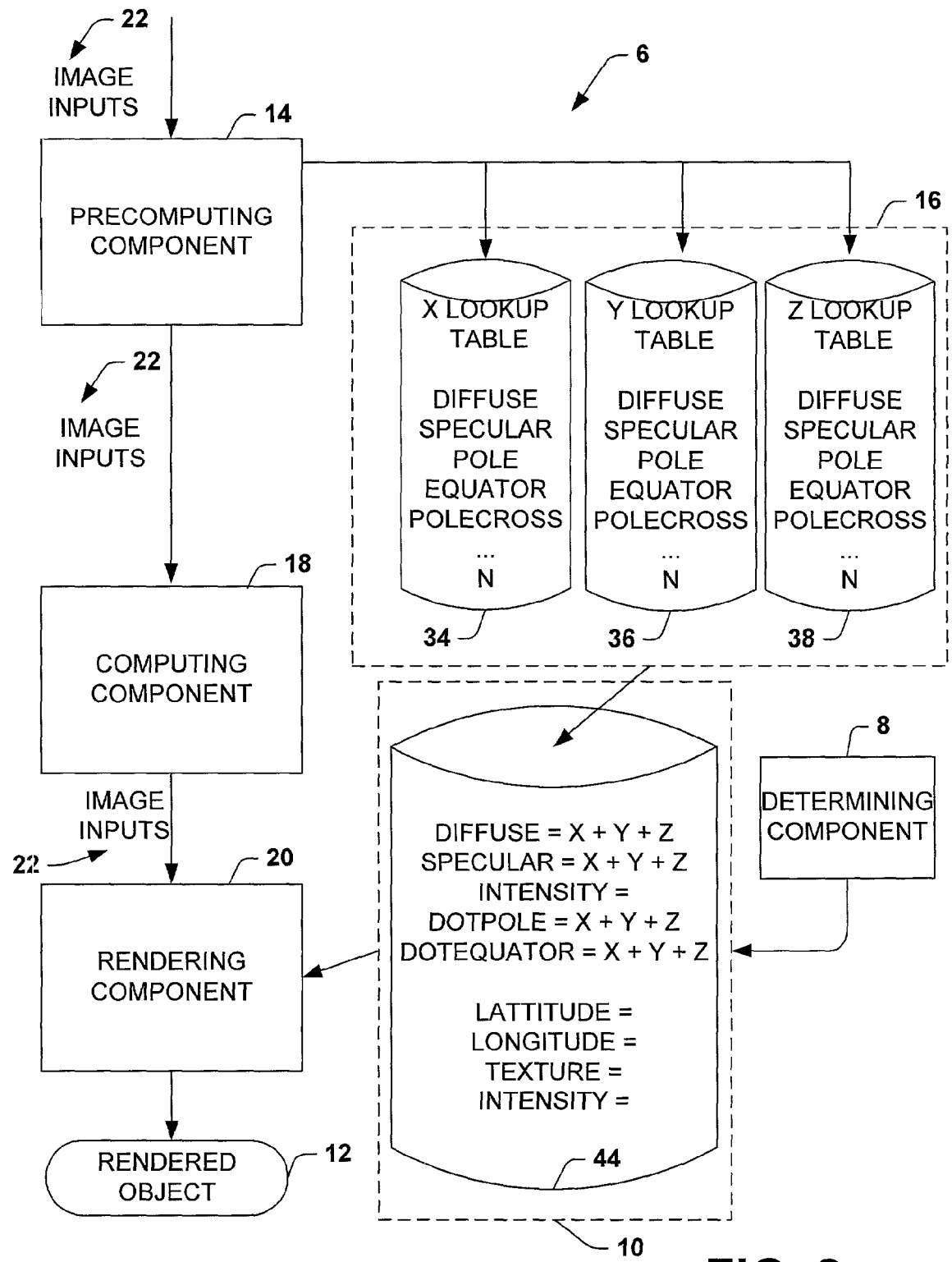
FIG. 2 is a schematic block diagram further illustrating a system for rendering images of objects in accordance with an aspect of the present invention.

FIG. 2 further illustrates the system 6 for rendering images of lit, textured spheres. The N attributes 16 that may be pre-computed by the pre-computing component 14 may include, but not be limited to, an ambient lighting component, a diffuse lighting component, a specular lighting component, a pole component, an equator component, and a component characterizing where the pole vector crosses the equator vector. Since a pixel in the rendered object 12 may be positionable in a three-dimensional space via x,y,z coordinates, the N attributes 16 may be collected into one or more lookup tables. For example, in FIG. 2, attributes associated with the x coordinate have been collected into an x lookup table 34. Similarly, attributes associated with the y coordinate have been collected into a y lookup table 36 and attributes associated with the z coordinate have been collected into a z lookup table 38. Storing such pre-computable attributes in lookup tables may mitigate problems in conventional rendering systems by reducing the total number of calculations employed in rendering an image of an object. The pre-computed N attributes 16 may be employed by the computing component 18 to compute the M attributes 10.

Conventionally, computing the M attributes 10 may involve repeated computations of values, which in the present invention have been pre-computed and stored in the N pre-computed attributes 16.

One or more formulae 44 may be involved in computing the M attributes 10. One or more of the M attributes 10 may be computed using one or more values from the x, y and z lookup tables 34, 36 and 38. For example, a diffuse lighting component calculation may include the addition of an integer diffuse lighting component from the x lookup table 34 with an integer diffuse lighting component from the y lookup table 36 and an integer diffuse lighting component from the z lookup table 38. Conventionally, a diffuse lighting component calculation may have included one or more floating-point calculations and may not have included lookups of previously calculated integer values. Thus, the present invention increases the speed with which renderings may be achieved.

Figure 3:
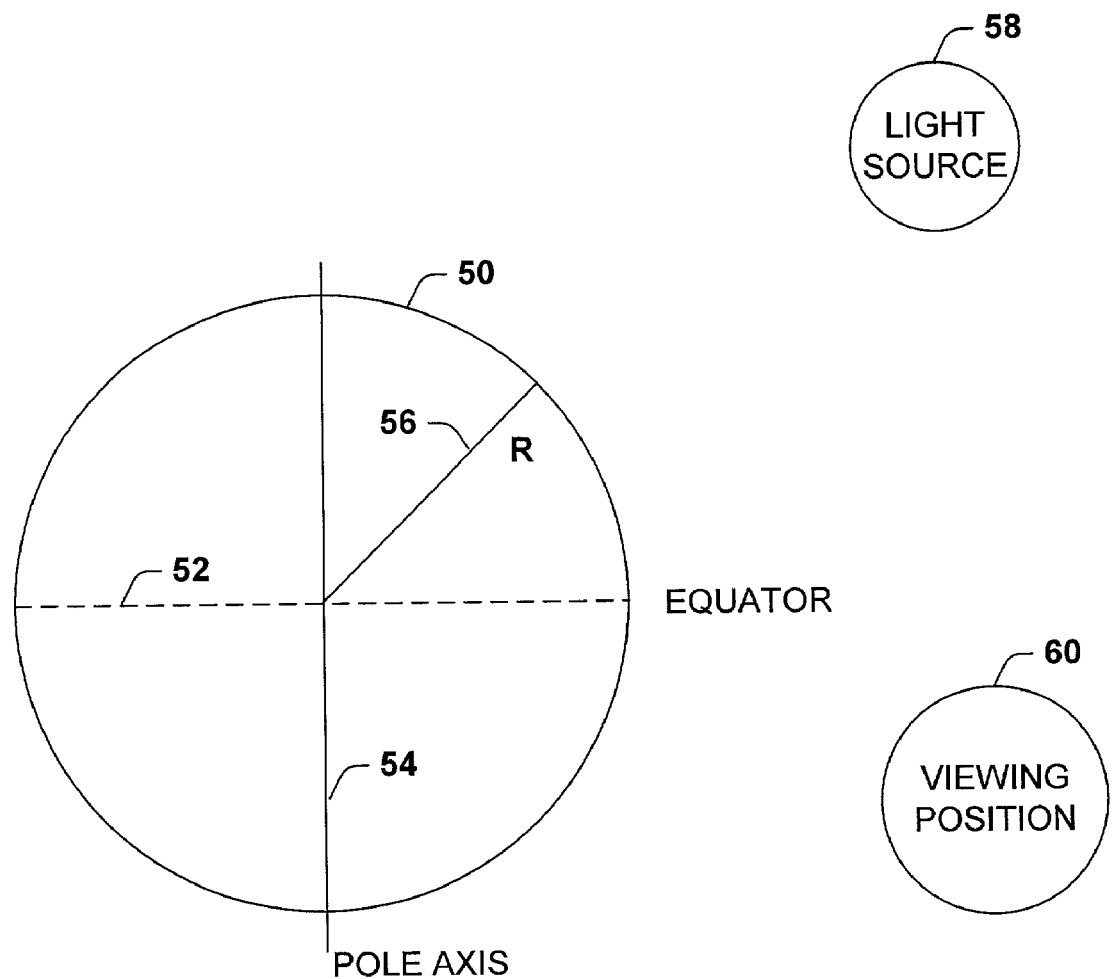
FIG. 3 is an illustration of a light source and a viewing position located relative to a two-dimensional representation of a sphere in accordance with an aspect of the present invention.

Turning now to FIG. 3, a two-dimensional representation of a sphere 50 is illustrated. The sphere 50 may be characterized by one or more attributes associated with rendering the sphere 50. For example, the sphere 50 may include an equator vector 52 describing where the equator of the sphere 50 lies. Similarly, the sphere 50 may include a pole vector 54 describing the pole axis of the sphere 50. The sphere 50 may be of a radius 56. Note that any vector emanating out from the center of the sphere 50 will be normal to the surface of the sphere 50 at the point it intersects the surface of the sphere 50.

Associated with the sphere 50 may be a light source 58 and a viewing position 60. Although only one light source 58 and one viewing position 60 are illustrated, it is to be appreciated by one skilled in the art that one or more light sources may be associated with a sphere and similarly one or more viewing positions 60 may be associated with a sphere. The location of the light source 58 relative to the center of the sphere 50 maybe involved in the calculations for computing one or more of the ambient, diffuse and specular lighting components for the sphere 50. The location of the viewing position 60 relative to the center of the sphere 50 may similarly be involved in the calculations for computing one or more of the diffuse and specular lighting components for the sphere 50.

Figure 4:
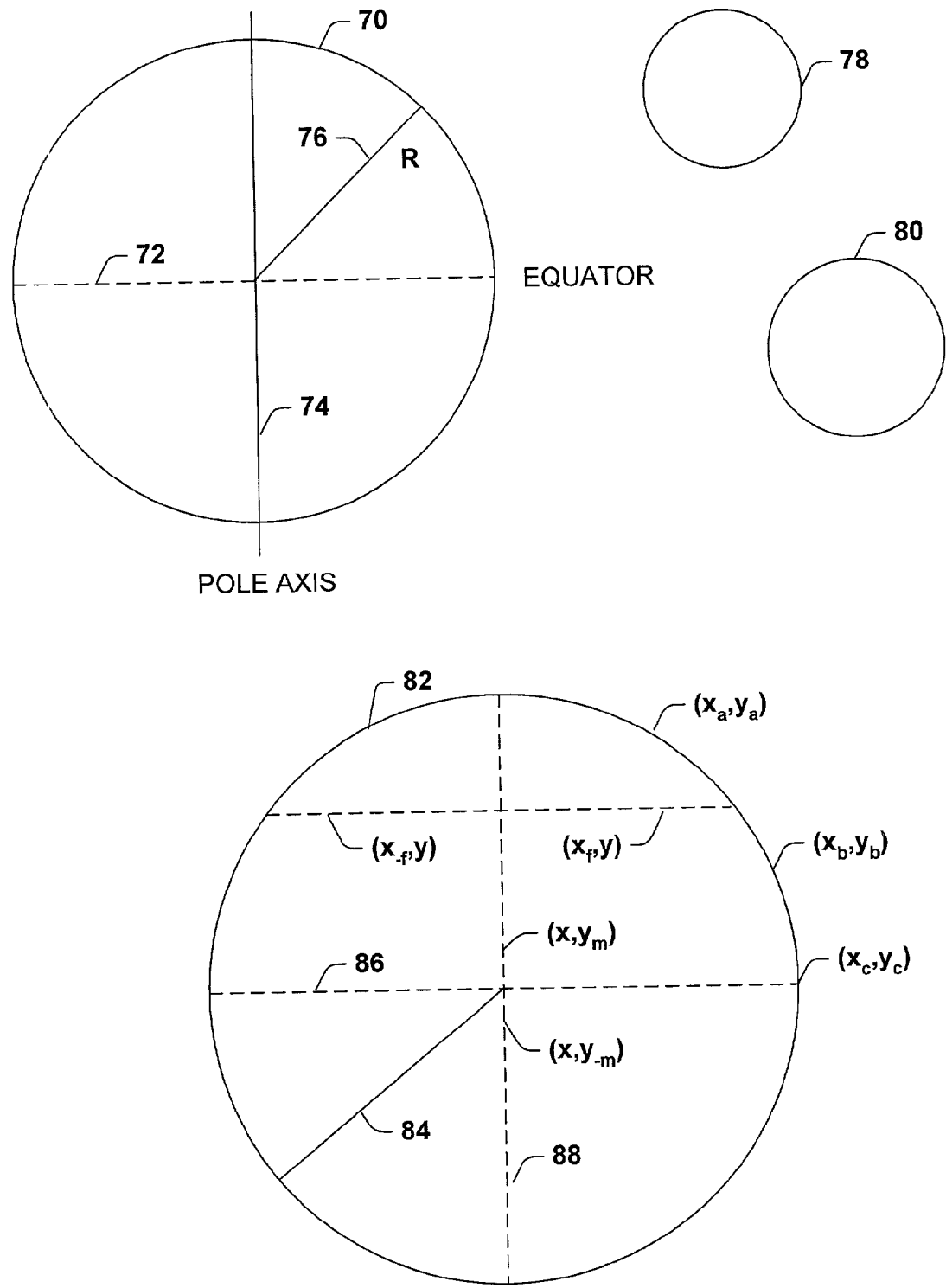
FIG. 4 is an illustration of several different sized spheres and the symmetry of a sphere about its axes in accordance with an aspect of the present invention.

Turning now to FIG. 4, a sphere 70 is illustrated along with two spheres 78 and 80 of different sizes than sphere 70. The sphere 70 may be characterized by one or more attributes associated with rendering the sphere 70. For example, the sphere 70 may include an equator vector 72, a pole vector 74 and a radius 76. The spheres 78 and 80 may have similar attributes associated with them, but since they may be of different sizes and orientations, the radius, equator vector and pole vector may be different than those for the sphere 70. Although there is a potentially infinite number of spheres that may be characterized using a radius, equator vector and pole vector, the present invention takes advantage of the fact that a subset of the potentially infinite number of spheres is likely to be rendered.

Thus, in the present invention, the boundaries of a set of spheres determined by a set of radii may be pre-computed and stored in one or more edge buffers. Thus, the computations involved in determining the edges of a sphere to be rendered may be made before any request to render a sphere is received. Similarly, certain values that may computable due to the symmetry of a sphere may be pre-computed and stored. For example, a sphere 82 may have a radius 84.

Given the radius of a sphere, the x and y coordinates of the edges of a sphere may be computed using:

$$r^2 = x^2 + y^2. \tag{1}$$

Thus, for a set of radii, the corresponding sets of x and y coordinates for each radius may be pre-computed, where the x and y coordinates for each radius are the values that are bounded by the coordinates in the edge buffer. Again, these calculations may be made before any request to render a sphere is received. Thus, when a rendering of a sphere of a certain radius is desired, the location of the pixels that will represent the edge of the sphere may be looked up from the stored edge buffers pre-computed by the present invention. Thus the time and complexity of rendering a sphere are decreased.

Given that screen locations may be identified by integer coordinates in an (x,y) plane, the x and y coordinates for each radius may be stored in integer format. Since integer arithmetic may be faster than floating point arithmetic in many microprocessors, a further decrease in the time and complexity of rendering a sphere may be achieved by employing integer arithmetic. In a sphere 82, edge pixels $(x_a, y_a)$, $(x_b, y_b)$ and $(x_c, y_c)$ are provided as examples of the (x,y) coordinates that may be pre-computed and stored for a sphere of a known radius.

The sphere 82 is symmetrical about its equator 86 and/or its pole axis 88. Thus, certain points may be located by (x,y) coordinates that have similar magnitudes but different signs. For example, the point located at $(x_{-f}, y)$ being located an equal distance from the pole axis 88 as the point located at $(x_f, y)$ may share one or more characteristics with the point located at $(x_f, y)$. The two points differ in the sign of the x coordinate, but not in the magnitudes. But since $x^2 = (-x)^2$, and since many computations concerning rendering involve the square of a coordinate, computations concerning one point may be employed for the symmetrical point. Thus, the overall number of computations may be decreased, and the overall time for rendering an object may be improved. Similarly, the point located at $(x, y_m)$, being located an equal distance from the equator 86 as the point located at $(x, y_{-m})$ may share one or more characteristics with the point located at $(x, y_{-m})$, differing in the sign of the y component. The points differ in the sign of the y coordinate, but not in the magnitudes. Again, since $y^2 = (-y)^2$, and since many rendering computations involve the square of a coordinate, computations concerning one point may be employed for the symmetrical point. Thus, again, the overall number of computations may be decreased with a corresponding increase in rendering speed.

Similarly, given a radius r, and an (x,y) pair, the height z of a pixel may be computed using:

$$z = \text{square root}(r^2 - y^2 - x^2) \tag{2}$$

For a sphere with a known radius r, the set of locations (x,y,z) may thus be pre-computed and stored in a lookup table and used later in rendering calculations employing light locations, colors and intensities since one or more attributes concerning the locations (x,y,z) are invariant to the location, color or intensity of a light source and are invariant to the location of a viewing source. Performing such pre-computing before rendering may decrease the overall number of computations required at rendering time and thus lead to an increase in the efficiency of rendering spheres.

Figure 5:
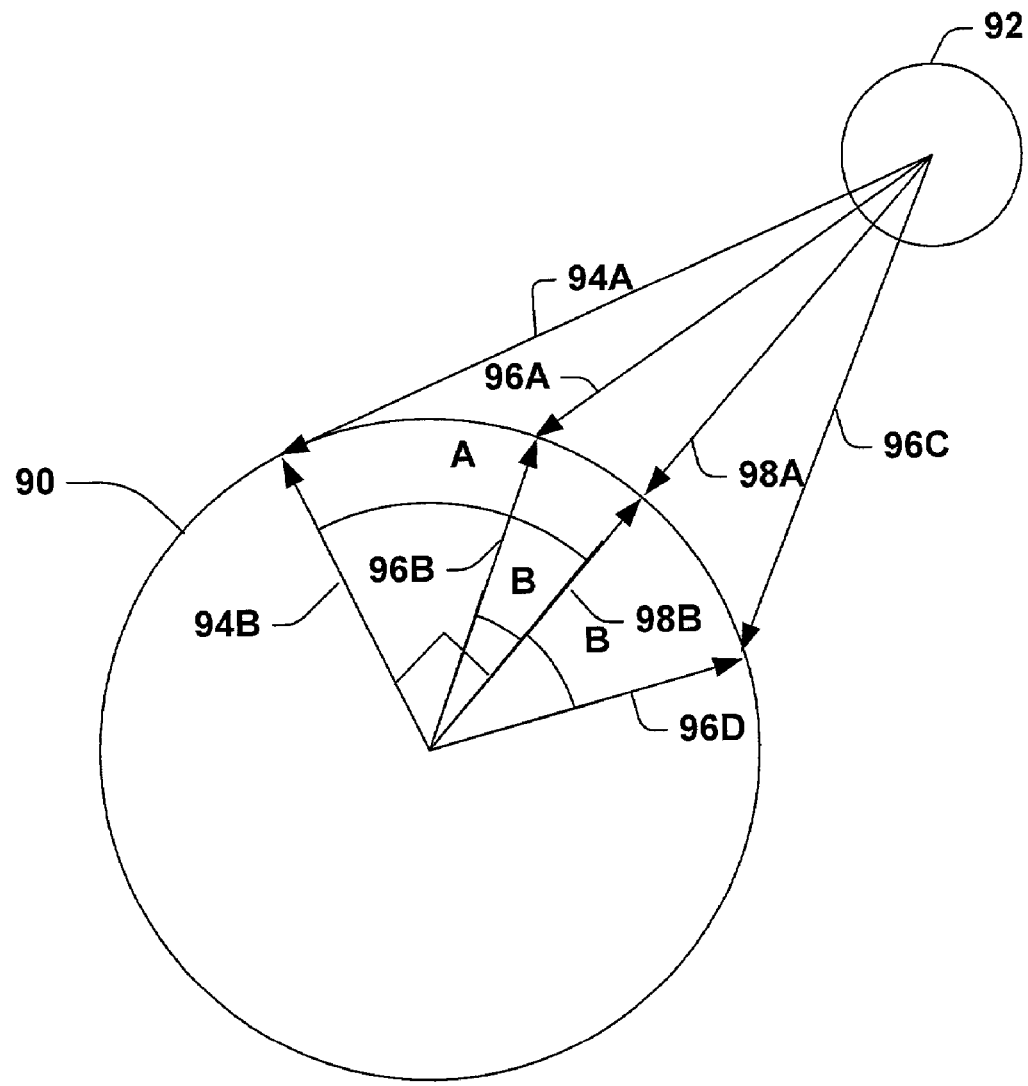
FIG. 5 is an illustration of several rays of light from a lighting source contacting a sphere.

Turning now to FIG. 5, a sphere 90 and a light source 92 are illustrated. The light source 92 may produce one or more rays of light that may be characterized by vectors. For example, vectors 94A, 96A, 98A and 96C represent rays of light emanating from the lighting source 92. Rays of light may contact the sphere 90 at different angles of incidence. For example, vector 94A represents a ray of light that contacts the sphere 90 at 90 degrees to a normal vector 94B emanating from the center of the sphere 90. Such a ray of light may have a negligible effect on the lighting of a pixel on the sphere 90 located at the point where the ray of light characterized by the vector 94A meets the sphere 90. The dot product of the vectors 94A and 94B is zero, and thus the negligible effect of the ray of light represented by vector 94A may be accounted for by employing the dot product between the vectors 94A and 94B in calculations determining the effect of the ray of light characterized by vector 94A.

Vector 98A represents a ray of light that contacts the sphere 90 at 0 degrees to a normal vector 98B emanating from the center of the sphere 90. Substantially all of such a ray of light may have an effect on the lighting of a pixel on the sphere 90 located at the point where the ray of light characterized by the vector 98A meets the sphere 90. The dot product of the vectors 98A and 98B is one, and thus the lighting effect from the ray of light characterized by the vector 98A may be accounted for by employing the dot product between the vectors 98A and 98B in calculations determining the effect of the ray of light characterized by vector 98A.

Vectors 96A and 96C represent rays of light that contact the sphere 90 at an angle between 0 degrees and 90 degrees to normal vectors 96B and 96D respectively emanating from the center of the sphere 90. Such rays of light may have an effect on the lighting of a pixel on the sphere 90 located at the point where the rays of light characterized by the vectors 96A and 96C meet the sphere 90. But the effect may be less than the effect of the ray of light characterized by vector 98A and it may be more than the effect of the ray of light characterized by the vector 94A. The dot product of the vectors 96A and 96B is greater than zero and less than one, and thus the lighting effect of the ray of light characterized by the vector 96A may be accounted for by employing the dot product between the vectors 96A and 96B in calculations determining the effect of the ray of light characterized by vector 96A. Due to the symmetrical nature of the sphere 90, the dot product between vector 96C and 96D may be substantially similar to the dot product between vectors 96A and 96B. In the present invention, such symmetries are accounted for and thus the dot product between vector 96A and 96B may be employed in the place of the dot product between vectors 96C and 98C, thus reducing the overall number of calculations involved in rendering an object and thus increasing the speed and efficiency of rendering an object. Further, given a sphere of radius r positioned at location $(x_1, y_1)$ and a lighting source positioned at location $(x_2, y_2)$, the set of dot products for substantially all the possible rays of light emanating from the light source contacting substantially all the possible normal vectors emanating from the center of the sphere may be pre-computed and stored in lookup tables. Thus, if the intensity of the light source, the color of the light source, or other attributes not related to the relative positions of the light source and the sphere change, calculations involved in rendering the sphere based on those changes may not require re-calculations of the stored dot products, thus increasing the efficiency of rendering lit spheres.

Figure 6:
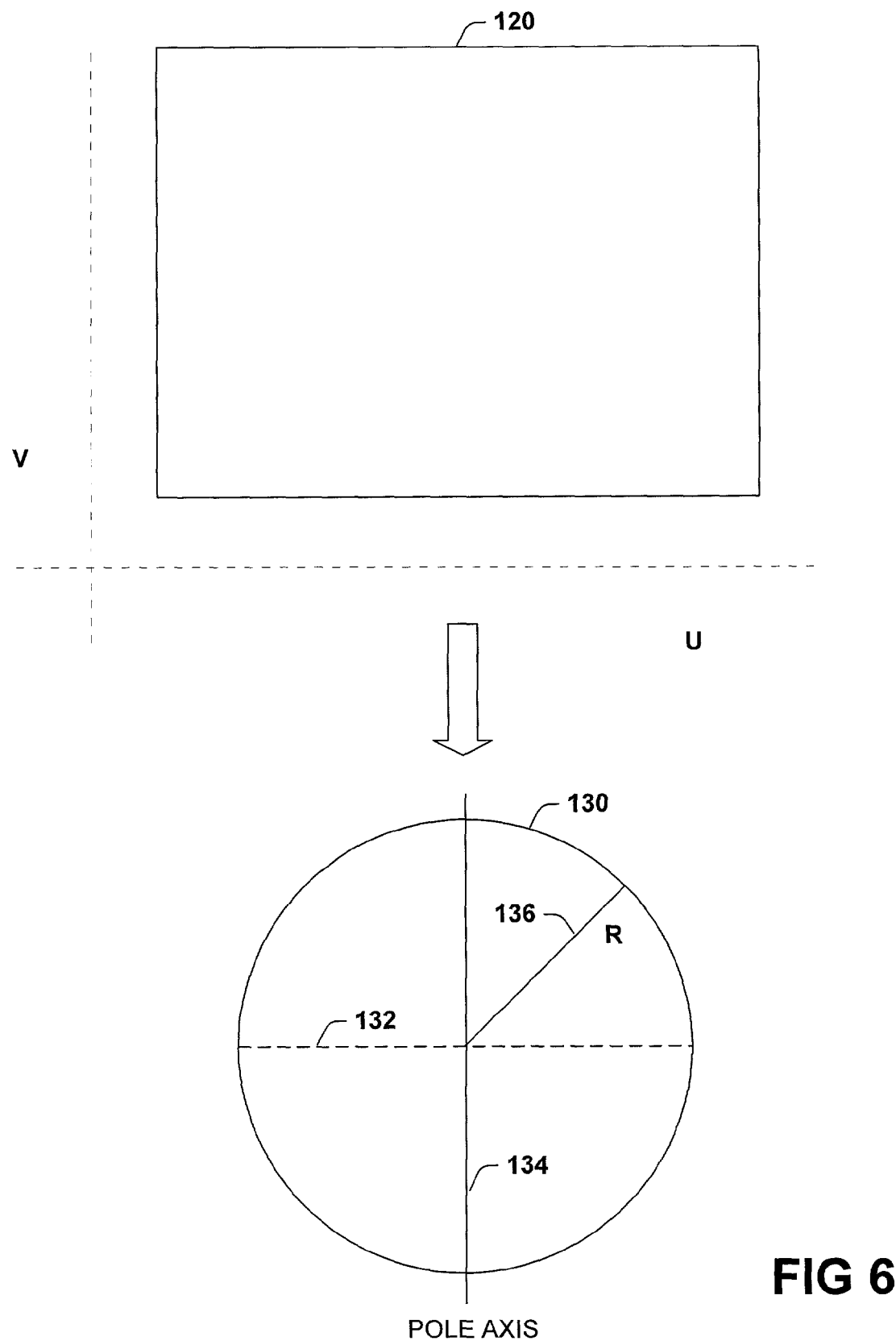
FIG. 6 is an illustration of a two dimensional plane being mapped onto a three dimensional sphere in accordance with an aspect of the present invention.

Turning now to FIG. 6, a two dimensional surface 120 being mapped onto a three dimensional sphere 130 is illustrated. The sphere 130 may be characterized by an equator vector 132, a pole vector 134 and a radius 136. Conventionally, mapping the two dimensional surface 120 onto the three dimensional surface 130 may have required integer and floating point calculations undertaken at rendering time by a rendering program. But the present invention mitigates processing time problems associated with such run time calculations by taking advantage of pre-computed values. The floating point calculations may include latitude and longitude calculations. For example, latitude may be computed using:

$$\text{Latitude} = \arccos(\text{normal} \cdot \text{pole}) \quad (3)$$

Similarly, longitude may be computed using the sine of the latitude divided into the dot product of a normal vector and an equator vector.

$$t = (\text{normal} \cdot \text{equator})/\sin(\text{latitude})$$

Clamp t to [−1, 1] range $$\text{Longitude} = \arccos(t)/2 * PI \quad (4)$$

Thus a point on the two dimensional surface 120 may be located using a (u,v) coordinate system, (u and v being floating point numbers ranging from 0.0 to 1.0) and the corresponding point on the three dimensional surface 130 may be located using a latitude and longitude, where the mapping from (latitude, longitude) to (u,v) is a one to one mapping. However, increases in performance can be achieved due to the pre-computing of portions of the latitude and/or longitude equations described above. A similar process may be employed for two-dimensional surfaces representing bump maps.

Turning now to FIG. 7A, a segment of pseudocode for pre-computing N attributes employed in rendering an image of an object is illustrated. It is to be appreciated by one skilled in the art that this pseudocode represents but one possible implementation of the steps involved in pre-computing N attributes associated with rendering an image of an object. While in the pseudocode in FIG. 7A the instructions for pre-computing the N attributes are contained in the same DrawASphere procedure as the pseudocode in FIG. 7B, it is to be appreciated by one skilled in the art that separate procedures may be employed, and that a set of N attributes for a set of spheres may be pre-computed independent of a request to render a sphere.

Turning now to FIG. 7B, a segment of pseudocode for computing M attributes employed in rendering an image of an object is illustrated. It is to be appreciated by one skilled in the art that this pseudocode represents but one possible implementation of the steps involved in computing M attributes associated with rendering an image of an object. At location 150 in the pseudocode there is a calculation for the intensity to be assigned to a pixel on a sphere. The exemplary calculation is:

$$\begin{aligned}\text{Intensity} = &(\text{diffuse} * \text{diffuseFactor}) + \\ &(\text{specular} * \text{specularFactor}) \\ &+ (\text{ambient} * \text{ambientFactor})\end{aligned} \quad (5)$$

Thus, the effect of at least the diffuse lighting component, the specular lighting component and the ambient lighting component may be enhanced or diminished by the values of diffuseFactor, specularFactor and ambientFactor respectively. If the diffuseFactor is zero, then the calculations involved in determining the diffuseFactor may not be performed. For example, at location 152 in the pseudocode, the statement if(diffuseFactor==0)

may be inserted before the calculations at location 152 to cause those calculations to be bypassed if they will not be employed in later calculations. Similar statements may also be inserted to bypass calculating other attributes including, but not limited to, specular light, ambient light, color, and texture. Thus, the M attributes associated with rendering an object may be determined before rendering, leading to a decrease in the number of calculations required to render an object by excluding unnecessary calculations.

Figure 8:
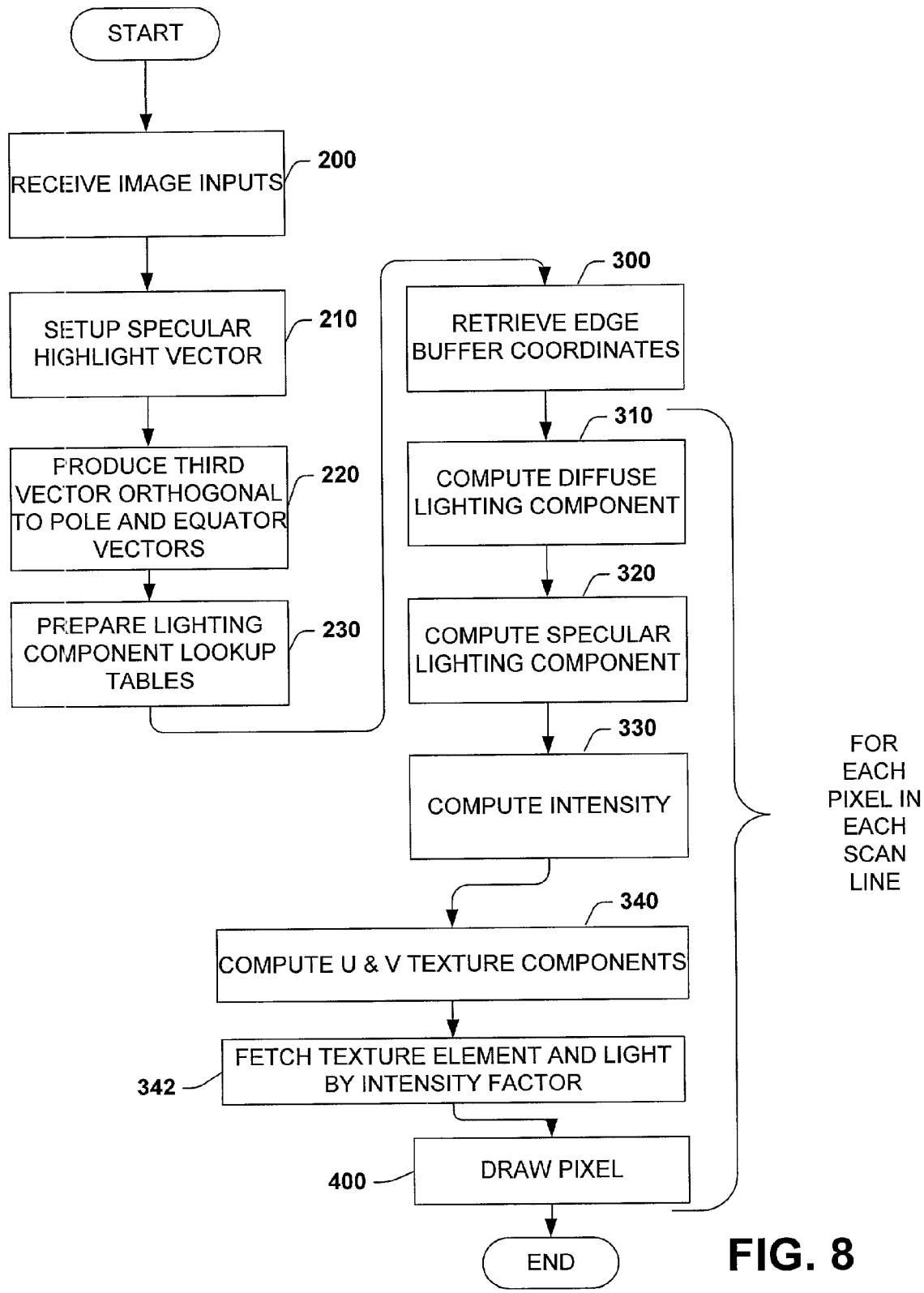
FIG. 8 is a flow chart illustrating a method for rendering an image of an object in accordance with an aspect of the present invention.
Figure 9:
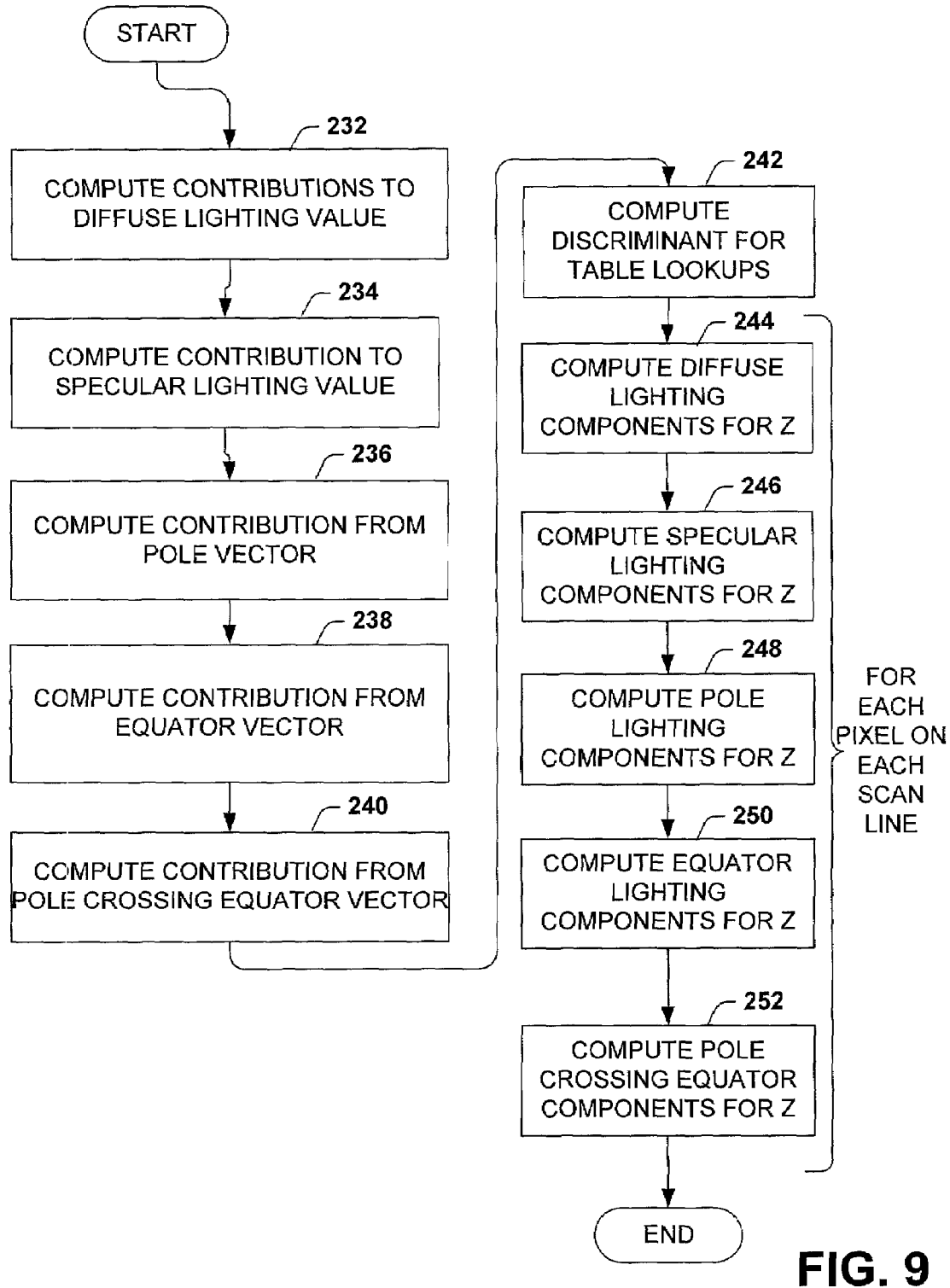
FIG. 9 is a flow chart further illustrating a method for rendering an image of an object in accordance with an aspect of the present invention.
Figure 10:
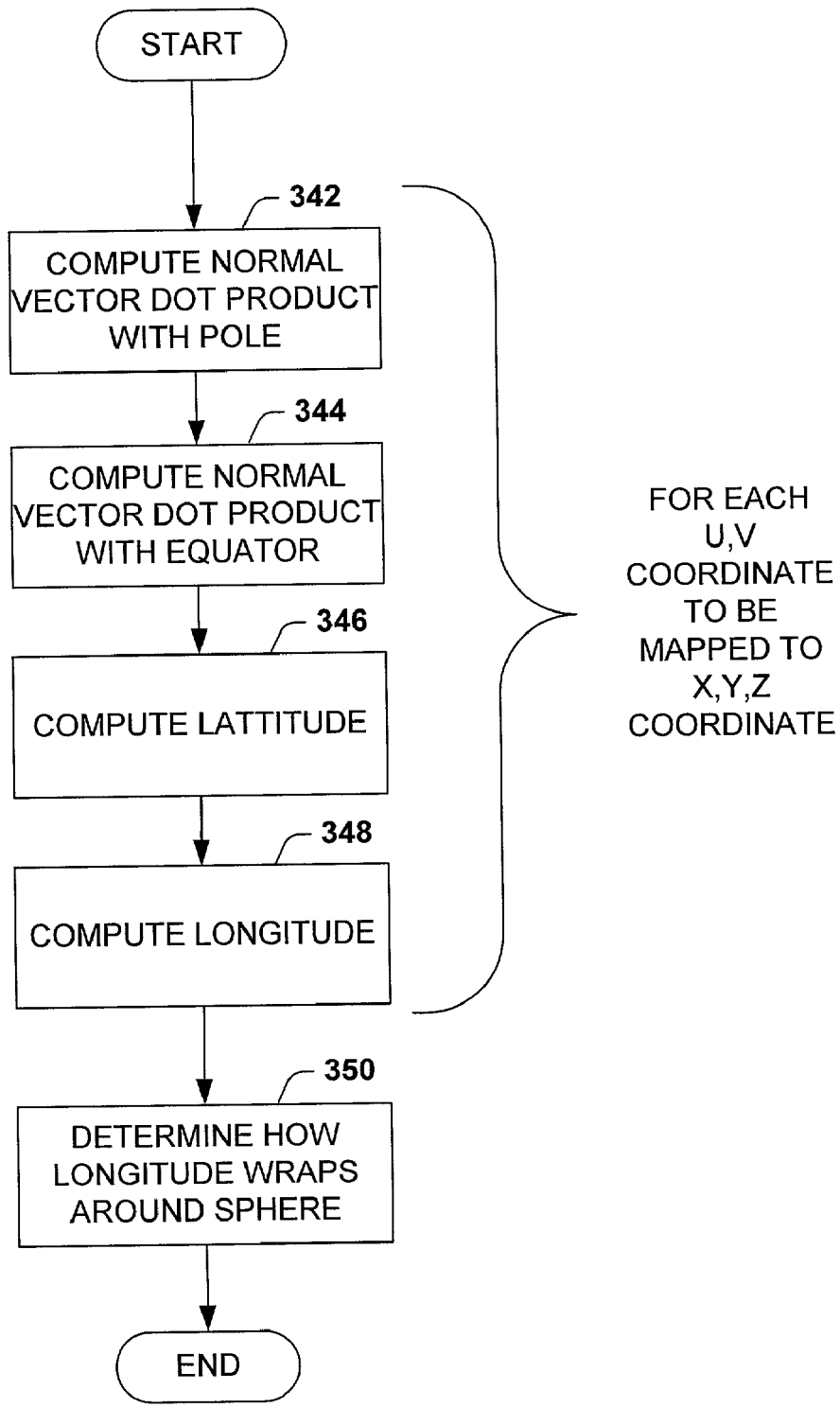
FIG. 10 is a flow chart further illustrating a method for rendering an image of an object in accordance with an aspect of the present invention.

In view of the exemplary systems shown and described above, methodologies, which may be implemented in accordance with the present invention, will be better appreciated with reference to the flow diagrams of FIG. 8, FIG. 9 and FIG. 10. While, for purposes of simplicity of explanation, the methodologies of FIG. 8, FIG. 9 and FIG. 10 are shown and described as a series of steps, it is to be understood and appreciated that the present invention is not limited by the order of the steps, as some steps may, in accordance with the present invention, occur in different orders and/or concurrently with other steps from that shown and described herein. Moreover, not all illustrated steps may be required to implement a methodology in accordance with the present invention.

Turning now to FIG. 8, a method for rendering an image of an object is flowcharted. At step 200, image inputs are received. For example, the radius, location, equator and pole axis of the sphere may be specified along with the location of one or more lighting sources, the location of one or more viewing positions, and a list of which rendering attributes are to be accounted for in rendering the object. For example, the requested rendering may not desire the color of the light sources to be accounted for.

At step 210, one or specular highlight vectors may be established. Such specular highlight vectors may be employed to determine where a shiny spot may appear on a sphere, for example. At step 220, the cross product of the pole and equator vectors can be computed, yielding a third vector which is orthogonal to the pole and equator vectors. Such a vector may be employed in latitude and longitude calculations. At step 230, lighting component lookup tables may be computed. For example, diffuse lighting components, specular lighting components, pole components and equator components may be pre-computed and stored in lookup tables. The diffuse, specular, pole and equator components are in turn calculated using values that are largely pre-computed, yielding increases in performance.

At step 300, pixel locations corresponding to the radius of the sphere may be retrieved from one or more pre-computed edge buffers. Thus, the total number of calculations involved in rendering the sphere may be reduced.

A three-dimensional sphere rendered on a two-dimensional surface, a computer monitor for example, may be represented in two dimensions. Thus, the sphere to be rendered may be rendered one scan line at a time. Thus, from step 310 to step 400, operations are performed for each pixel in each scan line of the sphere. At step 310, the diffuse lighting component for the pixel is computed. The diffuse lighting component for the pixel may include diffuse lighting components for the x coordinate, the y coordinate and the z coordinate of the pixel at location (x,y,z). At step 320, the specular lighting component for the pixel is computed. Like the diffuse lighting component, the specular lighting component for the pixel may include specular lighting components for the x coordinate, the y coordinate and the z coordinate of the pixel at location (x,y,z). At step 330, the intensity of the light for the pixel at location (x,y,z) is computed. The intensity calculation may include diffuse, specular and ambient lighting components.

At step 340, u and v texture components related to mapping a two-dimensional surface onto a three dimensional surface, like a sphere, may be computed. Such computations may include translating the (u,v) coordinates of a point on the two-dimensional surface to a latitude and longitude on the three-dimensional surface employing, for example, a one to one mapping. At step 342, the method fetches the texture element and light by intensity factor. At step 400, the pixel is drawn.

Turning now to FIG. 9, step 230 (FIG. 8) is illustrated in more detail. For a configuration of lighting parameters (e.g., light position, viewer position) for which components are to be pre-computed, steps 232 through 240 may be performed. The present invention takes advantage of the fact that for a computer display, there may be sets of desired spheres with known radii to be displayed, and for such a set, many calculations may be pre-computed before a request to render a sphere is received. Thus, at step 232 contributions to the x and/or y components of the diffuse lighting value may be calculated and stored in lookup tables. Similarly, at step 234, the contributions to the x and/or y components of the specular lighting value may be computed and stored in lookup tables. At step 236, contributions to the lighting component from the pole vector for a pixel positioned at location (x,y) may be computed. One or more of, the diffuse lighting components, the specular lighting components and/ or the pole lighting components can be pre-computed for one or more sets of initial parameters, the pre-computed values then being available for reuse one or more times during rendering of scan lines, yielding increases in performance. As noted above, the symmetries involved in a curved surface like a sphere may allow one or more parts of the calculations for location (x,y) to be used in computing the calculations for a location (x,–y) or for location (–x,y), thus reducing the number of calculations required to render an image of an object. At step 238 contributions to the lighting component from the equator vector may be computed and at step 240 pole crossing equator components may be computed.

Given the radius r of a sphere, and a set of (x,y) locations for pixels positioned on the sphere, a discriminant d may be computed for facilitating accessing one or more lookup tables storing components x and y components used in rendering equations. Thus, at step 242, a discriminant value may be computed for each pixel for which components were computed during steps 232 through 240. Computing the discriminant facilitates performing relatively simple and computationally inexpensive lookups of one or more values that were pre-computed and stored.

From steps 244 through 252, attributes for a z component of a pixel positioned at location (x,y,z) may be computed. A sphere of radius r may be rendered as a set of horizontal scan lines ranging in length from 1 pixel to 2r pixels. The horizontal scan lines may be symmetrical about the pole axis. Thus, steps 244 through 252 may be repeated for each scan line of a sphere with the value for y a constant for each scan line, and the value of x being symmetric about the pole axis. Fixing the value of y as a constant and using the symmetry about the pole axis, the total number of calculations for determining the z component (as described below) may be reduced.

Given a sphere of radius r, with the set of (x,y) coordinates corresponding to the area enclosed by the sphere, the height z of a pixel at location (x,y) may be computed using:

$$z=\text{square root}(r^2-x^2-y^2) \qquad (6)$$

Given the height z, attributes associated with rendering the object, based on the height z may be pre-computed. For example, the diffuse, specular, pole, equator and pole crossing equator components may be computed. Thus, at step 244, for each pixel on the scan line y, the diffuse lighting component for z may be computed and stored in a lookup table. Similarly at step 246, the specular lighting component may be computed and stored and at step 248 the pole lighting component may be computed and stored. At step 250 the equator lighting component for the z component may be computed and at step 252 the pole crossing component for the z component may be calculated.

Thus, for a sphere of radius r, with a set of pixels positioned at a set of locations characterizable by (x,y,z) coordinates, which coordinates are invariant to lighting position, color, intensity and viewing position, M attributes may be pre-computed and stored using the method detailed from steps 232 through 252 before a request to render a sphere is received. Thus, the number of steps required when a rendering request is received may be reduced.

Turning now to FIG. 10, step 340 (FIG. 8) is further flowcharted. For each point represented by a (u,v) coordinate on a two-dimensional surface to be mapped onto a three-dimensional surface, for example a sphere, the steps 342 through 348 may be performed. At step 342, a dot product of a normal vector emanating from the center of a sphere and a pole axis vector for the sphere is computed. At step 344, a dot product of a normal vector emanating from the center of a sphere and an equator vector is computed. At step 346, a latitude corresponding to the point located in the two-dimensional surface may be computed using equations well known in the art. Similarly, at step 348 a longitude corresponding to the point located in the two-dimensional surface may be computed using equations well known in the art. Conventionally, the entirety of the latitude and longitude equations of steps 346 and 348 may be computed during rendering. But given a set of spheres with a set of radii, the present invention may pre-compute and store those portions of the latitude and longitude equations that are invariant to other rendering attributes like light source location, color, intensity and viewer location. Thus, the number of calculations required after a rendering request is received is reduced. At step 350, a determination is made concerning how the longitude wraps around the sphere, which is useful for orienting the sphere.

Figure 11:
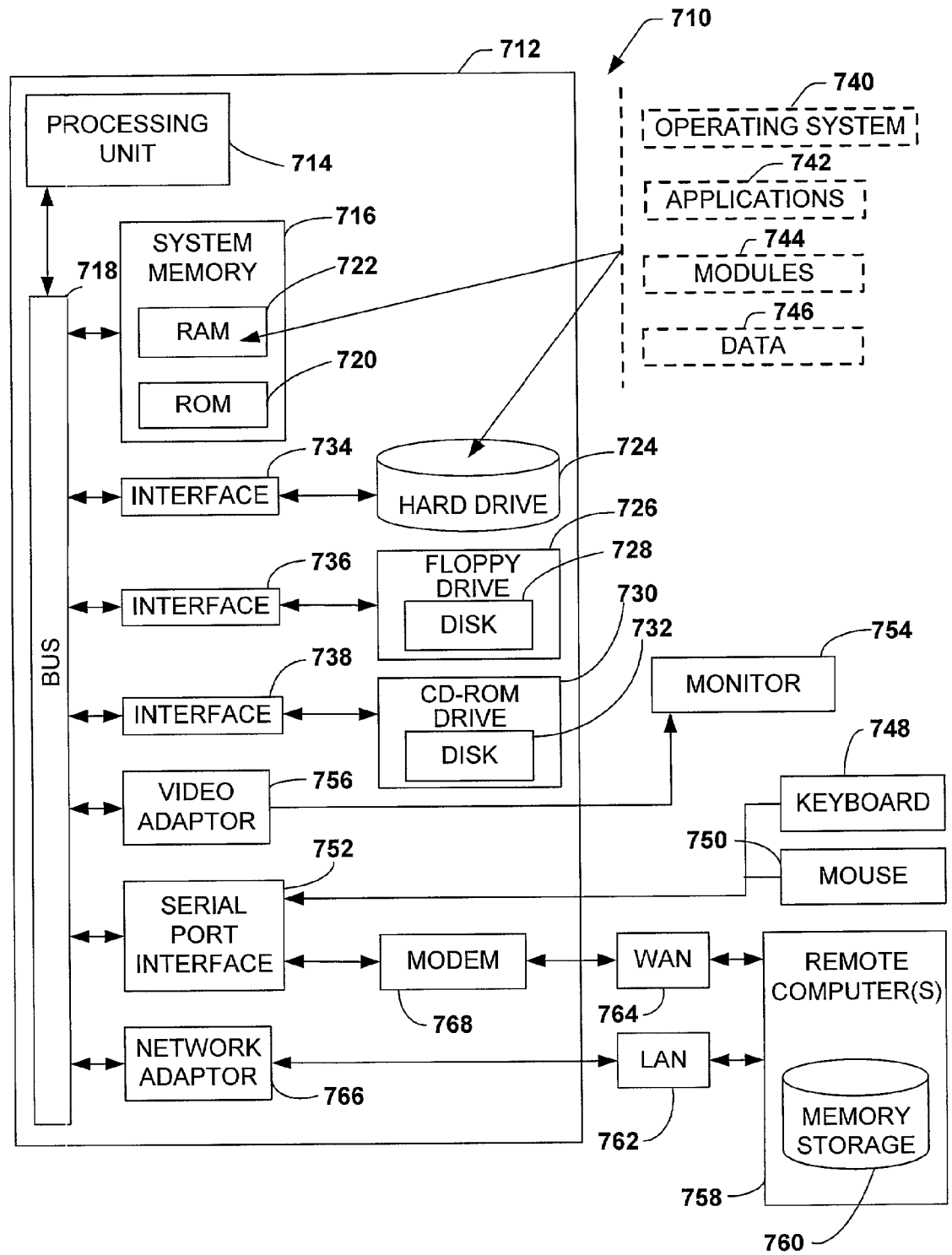
FIG. 11 is a schematic block diagram of an exemplary operating environment for a system configured in accordance with the present invention.

With reference to FIG. 11, an exemplary environment 710 for implementing various aspects of the invention includes a computer 712, including a processing unit 714, a system memory 716, and a system bus 718 that couples various system components including the system memory to the processing unit 714. The processing unit 714 may be any of various commercially available processors. Dual microprocessors and other multiprocessor architectures also can be used as the processing unit 714.

The system bus 718 may be any of several types of bus structure including a memory bus or memory controller, a peripheral bus, and a local bus using any of a variety of conventional commercially available bus architectures. The computer 712 memory includes read only memory (ROM) 720 and random access memory (RAM) 722. A basic input/output system (BIOS), containing the basic routines that help to transfer information between elements within the computer 712, such as during start-up, is stored in ROM 720.

The computer 712 further includes a hard disk drive 724, a magnetic disk drive 726, e.g., to read from or write to a removable disk 728, and an optical disk drive 730, e.g., for reading a CD-ROM disk 732 or to read from or write to other optical media. The hard disk drive 724, magnetic disk drive 726, and optical disk drive 730 are connected to the system bus 718 by a hard disk drive interface 734, a magnetic disk drive interface 736, and an optical drive interface 738, respectively. The drives and their associated computer-readable media provide nonvolatile storage of data, data structures, computer-executable instructions, etc. for the computer 712, including for the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, and the like, may also be used in the exemplary operating environment, and further that any such media may contain computer-executable instructions for performing the methods of the present invention.

A number of program modules may be stored in the drives and RAM 722, including an operating system 740, one or more application programs 742, other program modules 744, and program data 746. The operating system 740 in the illustrated computer can be any of a variety of commercially available operating systems.

A user may enter commands and information into the computer 712 through a keyboard 748 and a pointing device, such as a mouse 750. Other input devices (not shown) may include a microphone, an IR remote control, a joystick, a game pad, a satellite dish, a scanner, or the like. These and other input devices are often connected to the processing unit 714 through a serial port interface 752 that is coupled to the system bus 718, but may be connected by other interfaces, such as a parallel port, a game port, a universal serial bus ("USB"), an IR interface, etc. A monitor 754 or other type of display device is also connected to the system bus 718 via an interface, such as a video adapter 756. In addition to the monitor, a computer typically includes other peripheral output devices (not shown), such as speakers, printers etc.

The computer 712 may operate in a networked environment using logical connections to one or more remote computers, such as a remote computer(s) 758. The remote computer(s) 758 may be a workstation, a server computer, a router, a personal computer, microprocessor based entertainment appliance (e.g., a WebTV® client system), a peer device or other common network node, and typically includes many or all of the elements described relative to the computer 712, although, for purposes of brevity, only a memory storage device 760 is illustrated. The logical connections depicted include a local area network (LAN) 762 and a wide area network (WAN) 764. Such networking environments are commonplace in offices, enterprise-wide computer networks, intranets and the Internet.

When used in a LAN networking environment, the computer 712 is connected to the local network 762 through a network interface or adapter 766. When used in a WAN networking environment, the computer 712 typically includes a modem 768, or is connected to a communications server on the LAN, or has other means for establishing communications over the WAN 764, such as the Internet. The modem 768, which may be internal or external, is connected to the system bus 718 via the serial port interface 752. In a networked environment, program modules depicted relative to the computer 712, or portions thereof, may be stored in the remote memory storage device 760. It will be appreciated that the network connections shown are exemplary and other means of establishing a communications link between the computers may be used.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising", as comprising is interpreted as a transitional word in a claim.

What is claimed is:

1. A system for rendering an image of an object having a curved surface, comprising:
    a determiner that determines M number of attributes relating to rendering the image, M being an integer, wherein the determiner determines at least one of a diffuse lighting component, an ambient lighting component, a specular lighting component, an intensity, a pole vector, an equator vector, a latitude, a longitude, a color and a texture;
    a first processor that pre-computes N number of attributes relating to rendering the image, N being an integer less than or equal to M, and the N number of attributes being pre-computable and stored in at least one lookup table, and where the first processor pre-computes for one or more pixels, characterized by an x attribute, a y attribute and a z attribute, the N number of attributes including at least one of an ambient lighting component, a diffuse lighting component, a specular lighting component, a pole vector, an equator vector and a pole crossing equator vector; and
    a second processor that computes the M number of attributes, the second processor employs the pre-computed N number of attributes from the at least one lookup table to compute the M number of attributes.

2. The system of claim 1, the N number of attributes having characteristics associated with the symmetrical nature of objects having a curved surface.

3. The system of claim 1, the M number of attributes including one or more light sources.

4. The system of claim 1, the M number of attributes including one or more viewing positions.

5. The system of claim 1, wherein the first processor pre-computes an edge buffer for one or more objects.

6. The system of claim 1, the object is a lit sphere.

7. The system of claim 6, the object is a textured sphere.

8. The system of claim 1, the object is bump-mapped.

9. A method for rendering an image of an object having a curved surface, comprising:
    determining an M number of attributes relating to rendering the image, M being an integer, wherein the M number of attributes comprises, computing for one or more pixels, and at least one of a diffuse lighting component, an ambient lighting component, a specular lighting component, an intensity, a pole vector, an equator vector, a latitude, a longitude, a color and a texture;
    pre-computing an N number of attributes relating to rendering the image, N being an integer less than or equal to M, where the N number of attributes are stored in at least one lookup table, and where the N number of attributes comprises, computing for one or more pixels, characterized by an x attribute, a y attribute and a z attribute, the N number of attributes including at least one of an ambient lighting component, a diffuse lighting component, a specular lighting component, a pole vector, an equator vector and a pole crossing equator vector;
    employing the pre-computed N number of attributes from the at least one lookup table to compute the M number of attributes; and
    rendering an image based, at least in part, on the N pre-computed attributes and the M computed attributes.

10. The method of claim 9, wherein pre-computing the N number of attributes relating to rendering the image further comprises:
    pre-computing an edge buffer for one or more spheres.

11. The method of claim 9, the N number of pixel attributes having characteristics associated with the symmetrical nature of objects having a curved surface.

12. The method of claim 9, the M number of attributes including one or more light sources.

13. The method of claim 9, the M number of attributes including one or more viewing positions.

14. The method of claim 9, wherein the object is a lit sphere.

15. The method of claim 14, wherein the sphere is textured.

16. The method of claim 9, wherein the object is bump-mapped.

17. A computer-readable medium having computer-executable instructions for performing the method of claim 9.

18. A system that facilitates rendering an image of an object having a curved surface, comprising:
    a determination component that determines a plurality of attributes related to rendering the image, wherein the determination component determines at least one of a diffuse lighting component, an ambient lighting component, a specular lighting component, an intensity, a pole vector, an equator vector, a latitude, a longitude, a color and a texture;
    a pre-computation component that pre-computes a subset of the attributes related to rendering the image and stores the pre-computed subset of attributes in at least one lookup table, wherein the pre-computation component computes for one or more pixels, characterized by an x attribute, a y attribute and a z attribute, the pre-computed subset of attributes including at least one of: an ambient lighting component, a diffuse lighting component, a specular lighting component, a pole vector, an equator vector and a pole crossing equator vector; and
    a computation component that computes the plurality of attributes, the computation component employs the pre-computed subset of attributes from the at least one lookup table to compute the plurality of attributes.

19. The system of claim 18, the subset of attributes have characteristics associated with a symmetrical nature of objects having a curved surface.

20. The system of claim 18, the plurality of attributes include one or more light sources.

21. The system of claim 18, the plurality of attributes include one or more viewing positions.

22. The system of claim 1, the pre-computation component computes an edge buffer for one or more objects.

23. A system that facilitates rendering an image of an object having a curved surface, comprising:

means for determining a plurality of attributes related to rendering the image, wherein the determination means determines at least one of a diffuse lighting component, an ambient lighting component, a specular lighting component, an intensity, a pole vector, an equator vector, a latitude, a longitude, a color and a texture;

means for pre-computing a subset of the attributes related to rendering the image and storing the pre-computed subset of attributes in at least one lookup table, where the pre-computed subset of attributes comprises, computing for one or more pixels, characterized by an x attribute, a y attribute and a z attribute, the pre-computed subset of attributes including at least one of an ambient lighting component, a diffuse lighting component, a specular lighting component, a pole vector, an equator vector and a pole crossing equator vector; and means for employing the pre-computed subset of attributes from the at least one lookup table to compute the plurality of attributes.

* * * * *